(12) United States Patent
Binder

(10) Patent No.: US 10,697,560 B2
(45) Date of Patent: Jun. 30, 2020

(54) VALVE MECHANISM FOR CONTROLLING A FLUID, IN PARTICULAR AN ABRASIVE HIGH-VISCOSITY MATERIAL

(71) Applicant: BINDER GMBH, Ulm (DE)

(72) Inventor: Robert Binder, Laichingen (DE)

(73) Assignee: BINDER GMBH (DE)

( * ) Notice: Subject to any disclaimer, the term of this patent is extended or adjusted under 35 U.S.C. 154(b) by 115 days.

(21) Appl. No.: 15/109,837

(22) PCT Filed: Jan. 8, 2015

(86) PCT No.: PCT/EP2015/050243
§ 371 (c)(1),
(2) Date: Jul. 6, 2016

(87) PCT Pub. No.: WO2015/104323
PCT Pub. Date: Jul. 16, 2015

(65) Prior Publication Data
US 2016/0327183 A1 Nov. 10, 2016

(30) Foreign Application Priority Data
Jan. 8, 2014 (DE) .................. 10 2014 200 150

(51) Int. Cl.
*F16K 41/10* (2006.01)
*F16K 29/00* (2006.01)
*F16K 1/14* (2006.01)
(52) U.S. Cl.
CPC ............... *F16K 41/10* (2013.01); *F16K 1/14* (2013.01); *F16K 29/00* (2013.01)
(58) Field of Classification Search
CPC . F16K 41/10; F16K 1/14; F16K 29/00; F16K 31/1266; F16J 15/56; F16J 15/52; F16J 3/02

(Continued)

(56) References Cited

U.S. PATENT DOCUMENTS 1,332,765 A * 3/1920 Seiler ................... B60R 25/042
137/384.4
1,800,995 A * 4/1931 Gaunt ................ G05D 16/0652
137/505.36

(Continued)

FOREIGN PATENT DOCUMENTS

DE 803 541 7/1949
DE 1 110 966 7/1961

(Continued)

OTHER PUBLICATIONS

International Search Report. Application PCT/EP2015/050243. Dated Jun. 30, 2015.
Chinese Office Action Dated Jan. 17, 2018.

*Primary Examiner* — Craig J Price
*Assistant Examiner* — Andrew J Rost
(74) *Attorney, Agent, or Firm* — Gerald E. Hespos; Michael J. Porco; Matthew T. Hespos

(57) ABSTRACT

The invention relates to a valve mechanism (1; 1') for controlling a fluid, comprising a housing (2; 2') that has a fluid duct (3), further comprising a valve body (5) that is mounted on the housing (2) so as to be adjustable between an open position in which the valve body allows the fluid (F) to flow through the fluid duct (3) and a closed position in which the valve body fluid-tightly seals the fluid duct, and comprising a membrane-like sealing element (13) which is secured to the housing (2) at a first end portion (14) and to the valve body (5) at a second end portion. In the open state of the valve body (5), a side of the sealing element (13) that faces away from the fluid duct (3) rests against a wall section (17) between the two end portions (14, 15).

9 Claims, 3 Drawing Sheets

(58) Field of Classification Search
USPC .......... 251/335.2; 92/99, 98 R, 98 D, 92, 91, 92/90, 93
See application file for complete search history.

(56) References Cited

U.S. PATENT DOCUMENTS

| | | | |
|---|---|---|---|
| 2,103,673 A | | 12/1937 | Hoferer |
| 2,219,566 A | * | 10/1940 | Sausedde ............... B60T 11/224 |
| | | | 123/198 R |
| 2,298,314 A | * | 10/1942 | Sauzedde ............... B60T 11/224 |
| | | | 60/574 |
| 2,936,776 A | | 5/1960 | Veatch |
| 3,151,838 A | * | 10/1964 | Tripoli .................. F16K 41/103 |
| | | | 251/267 |
| 3,154,288 A | | 10/1964 | Tripoli |
| 3,529,622 A | | 9/1970 | Weise et al. |
| 4,036,112 A | * | 7/1977 | Hubschmann ......... F16J 15/006 |
| | | | 92/80 |
| 4,286,626 A | * | 9/1981 | Leiber .................... B60T 8/363 |
| | | | 137/625.65 |
| 4,749,342 A | * | 6/1988 | Fritsch .................. F04B 43/067 |
| | | | 417/388 |
| 4,860,793 A | * | 8/1989 | Hartl ........................ F16K 1/14 |
| | | | 137/606 |
| 6,883,780 B2 | * | 4/2005 | Browne ..................... F16K 7/12 |
| | | | 251/331 |
| 7,364,132 B2 | | 4/2008 | Browne et al. |
| 8,672,289 B2 | * | 3/2014 | Fenwick ................... F16K 1/14 |
| | | | 137/410 |
| 2006/0208214 A1 | * | 9/2006 | Okada ....................... F16K 1/14 |
| | | | 251/368 |

FOREIGN PATENT DOCUMENTS

| | | |
|---|---|---|
| FR | 1 259 417 | 4/1961 |
| GB | 652 296 | 4/1951 |
| GB | 1 210 065 | 10/1970 |
| GB | 2 199 393 | 7/1986 |
| GB | 2 242 255 | 9/1991 |
| JP | 60-73184 | 4/1985 |

\* cited by examiner

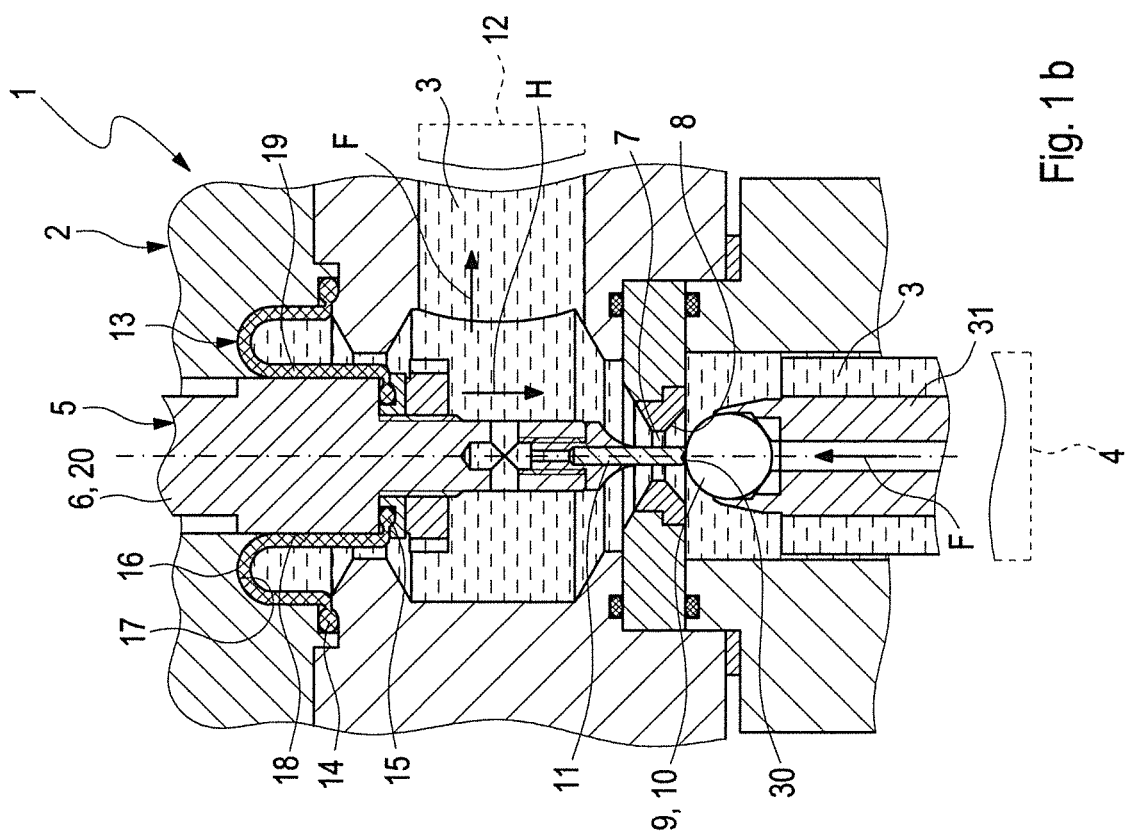
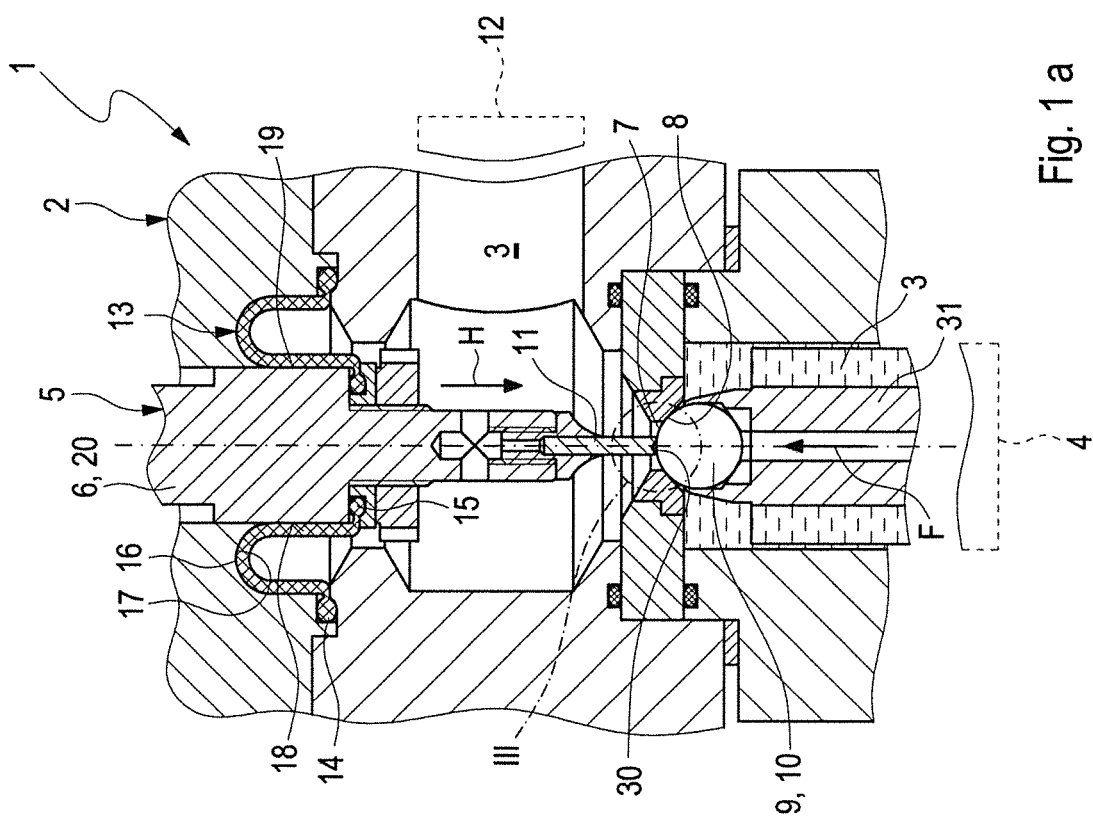
Fig. 1a
Fig. 1b

VALVE MECHANISM FOR CONTROLLING A FLUID, IN PARTICULAR AN ABRASIVE HIGH-VISCOSITY MATERIAL

BACKGROUND

1. Field of the Invention

The invention relates to a valve mechanism for controlling a fluid, in particular an abrasive high-viscosity material.

2. Description of the Related Art

A valve mechanism is a component for setting or regulating a fluid flow. The setting or regulating takes place in accordance with the function by adjustment of a valve body within a fluid duct of the valve mechanism. In a closed position of the valve body, a valve opening provided in the fluid duct is completely closed, and is opened up in an open position. Valve mechanisms can be configured here in such a manner that the valve opening flow cross section opened up by the valve body is linearly calibrated with the adjustment position of the valve body between closed and open position. In this case, the valve mechanisms are suitable not only for completely preventing, but also for variably setting a fluid flow predetermined from the outside. Such valve mechanisms are used as a central part of a control mechanism which permits a highly precise control of the fluid flow.

In conjunction with said valve mechanisms, not only liquids having high fluidity, but also what are referred to as high-viscosity materials are suitable as the fluids. The term "high-viscosity materials" below covers all mixtures of liquid and solid constituents. Various high-viscosity materials can be differentiated here in their physical or chemical properties, for example in respect of their specific weight, their dry material content, or as in respect of their mechanical and chemical properties in relation to other materials. "Abrasive high-viscosity materials" have a grinding effect in relation to materials with which they come into contact, which grinding effect can generally be attributed to the coarse graining of the solid constituents of the high-viscosity material.

In the meantime, the use of such abrasive high-viscosity materials in valve mechanisms of the type described above is problematic since they are capable of not inconsiderably damaging the components used in the valve mechanism because of their grinding action. Particularly at risk here are the movable components of the valve mechanism and equally the sealing elements installed in the valve mechanism, the wear of which can be considerably accelerated by the abrasive action of the high-viscosity material. This is true to a particular extent if said high-viscosity material flows through the valve mechanism under high pressure—the prior art discloses, for example, valve mechanisms which, in cooperation with modern high-pressure pumps, permit the pressure-regulated conveying of insulating materials or paints under a fluid pressure of 400 bar or more, which leads to an increase in the abrasive action of the high-viscosity materials.

The present invention is therefore concerned with the problem of specifying, for a valve mechanism, an improved embodiment which is distinguished in particular by improved wear resistance.

SUMMARY

Accordingly, the basic concept of the invention is to protect the components of the valve mechanism that are particularly at risk of wear—this includes the valve body which is adjustable within a fluid duct of the valve mechanism—against wear-promoting contact with the fluid flowing through the fluid duct by means of a diaphragm-type sealing element.

In order then to prevent the diaphragm-like design of the sealing element causing partial or complete destruction of same because of the extremely high fluid pressures occurring up to now during the conveying of high-viscosity materials—said fluid pressures may assume values of 400 bar or more, it is proposed to arrange the sealing element in the fluid duct of the valve mechanism in such a manner that said sealing element can be supported against a wall portion provided in the fluid duct. Said wall portion can be part of the housing of the valve mechanism or—in an embodiment proving elegant to a particular extent—may be part of an annular piston which is movable relative to the housing, as will be explained in more detail below. A crucial advantage of the solution presented here is that a diaphragm used as sealing element is clamped not only by the two end portions thereof between housing and valve body of the valve mechanism; what is more, in addition to said clamping between housing and valve body, the diaphragm-like sealing element is permitted virtually complete and flat support against a wall portion of the valve mechanism such that, even in a pressurized state of the fluid duct, damage to the diaphragm—for example in the form of cracking or other material failure—up to complete destruction can be prevented.

In contrast to conventional sealing elements in the manner of sealing rings or the like, the sealing element presented here is not exposed during the movement of the valve body to any sliding friction whatsoever which would lead in conjunction with an abrasive high-viscosity material to a wear-induced reduction in the sealing properties. By means of suitable structural measures, it can be ensured by a person skilled in the art in the ideal situation that the diaphragm can be supported against suitable mechanical components of the valve mechanism not only in sections in the region of the above-described wall portion, but as far as possible in the entire region between its two end portions. According to the function, the sealing element then ensures effective protection of the components arranged on a sealing-element side facing away from the fluid duct against damage by high-viscosity material. The valve body of the valve mechanism that is mounted adjustably on the valve housing and is therefore particularly susceptible to wear and which can moved between an open state, in which said valve body opens up the fluid duct for the through flow with the fluid, and a closed state, in which said valve body closes the fluid duct in a fluid-tight manner, can be particularly readily protected against damage. In the scenario according to the invention, the sealing element deploys its protective effect precisely in the region of the mutually movable contact surfaces of valve body and valve housing since an undesirable penetration of the abrasive high-viscosity material into an intermediate space between said two surfaces would lead to grinding down of the surfaces thereof due to sliding friction.

In a preferred embodiment, a valve opening which is bordered by a valve seat is provided in the fluid duct. The valve body is of at least two-part design and has a closure element which permits a fluid-tight closure of the valve opening by sitting on the valve seat in a closed position. In order to move said closure element away from the valve seat in order to open the valve opening, an actuating element is available which completes the closure element with respect to the valve body. In the scenario presented here, the closure element is intended to be placed in the fluid duct upstream of the valve opening such that said closure element is prestressed against the valve seat either—without an external action force—by the fluid flowing through the fluid duct or by a spring force and consequently closes the valve opening. In an advantageous manner, it is correspondingly appropriate to arrange the actuating element downstream of the closure element in the fluid duct. In order to open the valve opening, the actuating element is then pressed against the closure element and consequently the latter is pressed away from the valve seat. For this purpose, the actuating element can be connected in terms of drive to an external actuator, for example in the form of an electric motor known to a relevant person skilled in the art. As soon as the contact pressure force exerted on the closure element by the actuating element increases in terms of amount above the prestressing force produced by the fluid and acting in an opposed direction with respect to said contact pressure force, the closure element is moved away from the valve seat and the valve opening is consequently opened up.

It is particularly expediently recommended to design said actuating element as a lifting piston which is movable along a lifting direction in the fluid duct. The low-friction guidance of the lifting piston in the fluid duct can be ensured by a suitable structural configuration of the valve housing on which the lifting piston is mounted. The lifting piston has an outer circumferential surface to which the diaphragm-like sealing element can be fastened by its second end portion. It is expedient here, for example, to clamp the sealing element into a recess provided on the outer circumferential surface. In this scenario, the sealing element can have a supporting portion which is designed in the manner of a sleeve and in the region of which the sealing element is supported on the outer circumferential surface of the lifting piston—i.e. in addition to the support against the wall portion.

A particularly long service life of the sealing element can be obtained by a structurally particularly elegant embodiment in which said wall portion has a concave surface contour in a profile defined with respect to the lifting direction. In this manner, account is taken of the fact that the sealing element has a curved surface geometry, which can assume, for example, the form of an arc of a circle or the like, in said profile both in the open and in the closed state of the valve body in the region between the two end portions. The described concave surface contour of the wall portion makes it possible in turn for the sealing element to nestle without edges and completely against the surface of the concave wall portion in order to obtain the desired supporting effect according to the invention.

In an embodiment which is particularly simple to realize in terms of manufacturing, the wall portion is part of the housing of the valve mechanism. The wall portion serving to support the sealing element can be formed integrally here on the housing. Of course, however, the valve housing can also be constructed in multiple parts prior to the assembly. Over the course of the installation of the valve mechanism by means of the method known to a relevant person skilled in the art, various housing components can then be fastened to one another—welding of the individual components of the housing is somewhat conceivable.

In an advantageous development of the above-described embodiment, a sealing element of spring-elastic design permits a particularly large adjustment range of the lifting piston between its open and its closed position. Such a spring-elastic sealing element can expand during the movement of the lifting piston—and therefore of the second end portion of the sealing element fastened thereto—from the closed state into the open state and the required supporting of the sealing element against the wall portion can therefore be ensured for every possible adjustment position. The elastic expansion of the sealing element particularly expediently takes place substantially in the region of the above-described supporting portion, in the region of which the sealing element encompasses the lifting piston along its outer circumferential surface.

In an alternative embodiment to the refinements described above, said wall portion, against which the sealing element may be supported, is not part of the valve housing, but rather is part of an annular piston which is formed on the lifting piston along the circumferential direction thereof and is therefore movable together therewith along the lifting direction. In this scenario, a fluid chamber is provided in the housing of the valve mechanism, into which fluid chamber the fluid duct merges counter to the lifting direction of the lifting piston, and therefore the lifting piston extends partially in the fluid duct and partially in the fluid chamber. Fluid chamber and fluid duct are fluidically separated from each other by the annular piston in conjunction with the sealing element according to the invention which is supported against the first end side of the annular piston. Since the annular piston is movable together with the lifting piston along the lifting direction, said annular piston would be pushed away together with the lifting piston in the direction of the fluid chamber by the fluid flowing through the fluid duct in the event of a build up of pressure in the fluid duct. Since the sealing element is capable of following such a movement of the annular piston only to a limited extent because of the fastening of said sealing element to the housing, said sealing element would inevitably become detached from the annular piston, and therefore an intermediate space would be formed between sealing element and annular piston. However, in this case, the supporting of the sealing element against the annular piston—which supporting is necessarily required in order to prevent destruction of the diaphragm-like sealing element—would no longer be provided. In order to counteract this, a pressure coupling of the fluid chamber by means of same to the fluid duct is realized in such a manner that the fluid pressure acting on a first end side facing the fluid duct is compensated for at all times by a diametrically opposed counter pressure acting on the second end side of the annular piston that faces the fluid chamber; for this purpose, the fluid chamber is filled with an incompressible liquid. In other words, the annular piston is arranged along the lifting direction between incompressible liquid and sealing element, and therefore the second end side of said annular piston is pressurized by the incompressible liquid, whereas the first end side is pressurized by the fluid flowing through the fluid duct. In the present case, the term "incompressible liquid" covers all liquids which do not change their density even in the event of a change of pressure and are consequently suitable for said pressure coupling between fluid duct and annular piston. It goes without saying here that the liquid which is incompressible per se inevitably has a slight compressibility in the case of the fluid pressures present here of 400 bar and more. Nevertheless, such liquids are expressly covered by the literal sense of the term "incompressible liquids" used here.

A separating diaphragm, for example made of metal, which is provided in a passage opening between fluid chamber and fluid duct permits the transmission, which is required for the coupling in terms of pressure, of the fluid pressure prevailing in the fluid duct to the incompressible liquid of the fluid chamber without the incompressible liquid being mixed with the fluid flowing through the fluid duct.

Since the annular piston serves for spatially separating the fluid chamber from the fluid duct, the space volumes of fluid chamber and fluid duct are variable within a predetermined volumetric range because of the movability of the annular piston in the lifting direction. A movement of the annular piston with respect to the fluid duct leads, for example, to an increase in the space volume in the fluid chamber. Since the incompressible liquid provided in the fluid chamber could be distributed as a result to an enlarged space volume, an optimum coupling of the fluid duct in terms of pressure to the annular piston via the liquid would no longer be ensured. In order to counteract this, a radial step can now be provided along the lifting direction on the outer circumferential surface of the lifting piston in the region of the fluid chamber such that the diameter of the lifting piston increases counter to the lifting direction, i.e. away from the fluid duct. The arrangement and dimensioning of said radial step on the lifting piston take place in such a manner that the volumetric increase in the fluid chamber brought about during the movement of the lifting piston and therefore of the annular piston is compensated for again by the space volume additionally taken up by the lifting piston. In other words, to the same extent as the space volume of the fluid chamber is increased by the movement of the annular piston toward the fluid duct, by displacement of the volume by the lifting piston in the fluid chamber, the space volume in the fluid chamber is reduced by the same volume, and therefore the effective overall space volume of the fluid chamber remains the same.

In the case of the embodiments described above in conjunction with the use of an annular piston, the sealing element can be designed as a rolling diaphragm which does not necessarily have to have elastic properties. This is because a mechanical expansion of the sealing element does not necessary have to be connected to a movement of lifting piston and annular piston and to the movement associated therewith of the sealing element fastened to the lifting piston. Nevertheless, it is recommended to select an elastomer—having elastic properties—as sealing material for the sealing element in all of the scenarios explained above.

In the case of an embodiment which is particularly simple to realize structurally, the closure element is designed in the manner of a closure ball which is mounted rotatably in a ball holder. The actuating element comprises an actuating pin which interacts with the closure ball and is pressed away from the closure position by an axial end portion against the closure ball in order to move the closure ball.

In order to keep any wear effects occurring in the closure ball as small as possible, the actuating pin can be designed in such a manner that, upon contact with the closure ball, said actuating pin rotates the latter by a predetermined amount, with a torque being exerted, and therefore the contact surfaces between actuating element and closure ball change during each actuation of the actuating pin.

Said torque can be produced in an embodiment which is simple to realize technically by a recess being provided on an end side of the actuating pin that faces the closure ball, said recess being arranged eccentrically with respect to the longitudinal central axis of said actuating pin and by means of which a torque acting on the closure ball is produced by the actuating pin upon contact with said closure ball.

The above-explained design of the actuating pin to the effect that a torque is exerted on the closure ball, which torque leads to rotation of the closure ball and therefore to a change in the contact surfaces between actuating pin and closure ball in the case of two consecutive actuations of the actuating element has independent inventive character.

Further important features and advantages of the invention emerge from the dependent claims, from the drawings and from the associated description of the figures with reference to the drawings.

It goes without saying that the features mentioned above and those which have yet to be explained below are usable not only in the respectively stated combination, but also in different combinations or on their own without departing from the scope of the present invention.

Preferred exemplary embodiments of the invention are illustrated in the drawings and are explained in more detail in the description below, wherein the same reference signs refer to identical or similar or functionally identical components.

BRIEF DESCRIPTION OF THE DRAWINGS

FIG. 1a shows a roughly schematic illustration of a first example of the valve mechanism according to the invention in a closed position.

FIG. 1b shows the valve mechanism of FIG. 1 in an open position.

DETAILED DESCRIPTION

Figure 2A:
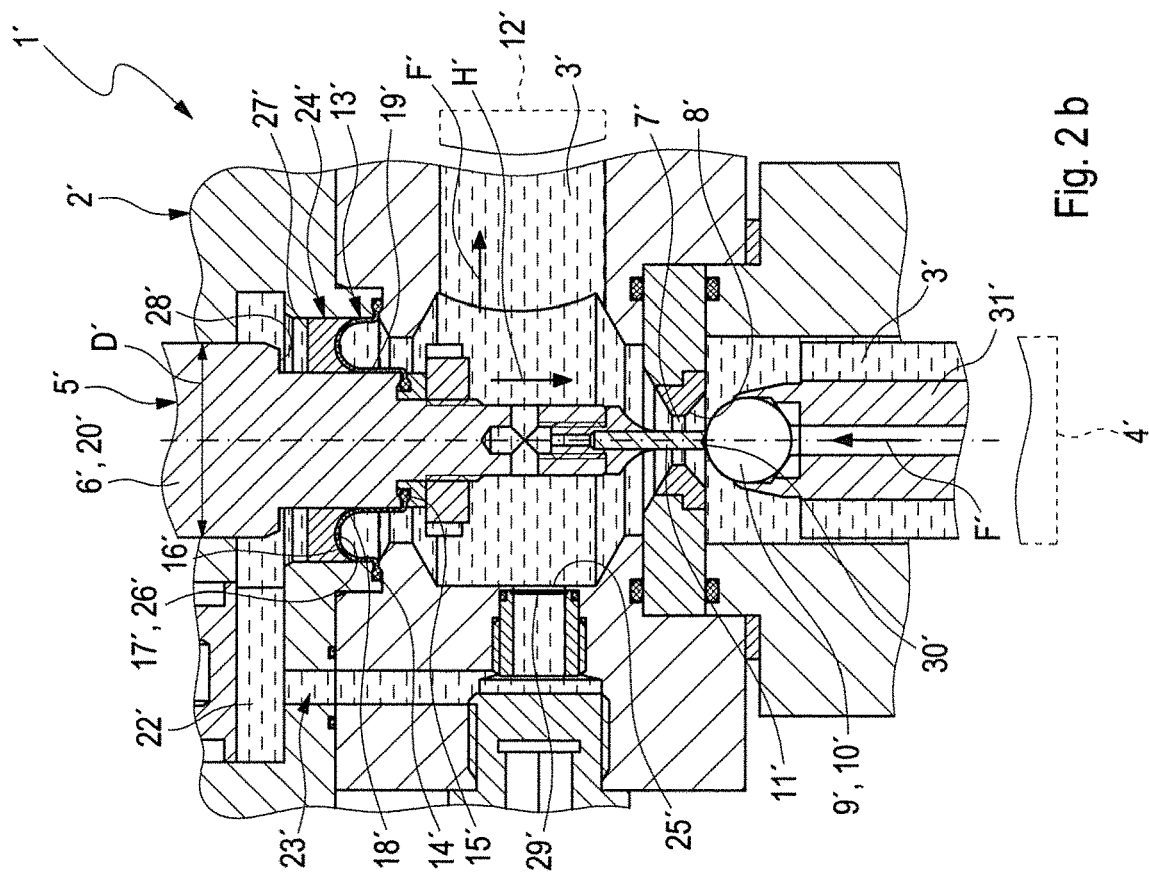
FIG. 2a shows a roughly schematic illustration of a second example of the valve mechanism according to the invention in a closed position.

FIG. 1 illustrates, roughly schematically and in a longitudinal section, a first example of a valve mechanism 1 according to the invention for controlling an abrasive high-viscosity material. Abrasive high-viscosity materials should be understood below as meaning any mixtures of liquid and solid constituents—such as, for example, paints or insulating materials—with a grinding action. The valve mechanism 1 has a sufficiently dimensioned housing 2 in which a fluid duct 3, through which the abrasive high-viscosity material flows, is provided. In order to introduce the high-viscosity material into the fluid duct 3, the valve mechanism 1 has an inlet opening 4 provided on the housing 2. The housing 2 accommodates a valve body 5 with an actuating element 20 in the form of a lifting piston 6 which is mounted on the housing 2 so as to be adjustable along a lifting direction H between the closed state, which is illustrated in FIG. 1a and in which said lifting piston opens up the fluid duct for through flow with the high-viscosity material, and an open state, which is shown in FIG. 1b and in which said lifting piston closes the fluid duct 3 in a fluid-tight manner.

The fluid duct 3 is provided with a valve opening 7 which is bordered by a valve seat 8 on a side facing away from the lifting piston 6. Said valve opening can be closed in a fluid-tight manner by means of a closure element 9 which completes the actuating element 20 with respect to the valve body 5 and is in the form of a closure ball 9. The closure ball 9 is arranged rotatably here in a ball holder 31 which, in turn, is mounted movably in the fluid duct 3. In the closed state of the valve mechanism 1, the closure ball 10 partially bears against the valve seat 8, as illustrated in FIG. 1a. In FIG. 1a, the flow direction of the high-viscosity material through the fluid duct is indicated by an arrow having the reference sign F. Since the closure element 9 is placed upstream with respect to the flow direction F of the valve opening 7 in the fluid duct, the pressurization acting in the flow direction F on the closure element 9 by the high-viscosity material ensures that the closure element 9 is pressed against the valve seat 8 without the action of an external force and consequently closes the valve opening 7. In order then to switch over the valve mechanism into the open state, an actuating pin 11 is formed on the end side of the lifting piston 6, said actuating pin being able to be pressed against the closure element 9, by movement of the lifting piston 6 in the lifting direction H, and—including the ball holder 31—being able to be moved away from the valve seat 8 counter to the fluid pressure produced by the high-viscosity material, which leads to the valve opening 7 being opened out. The lifting piston 6 can be connected in terms of drive to an external actuator (not shown), which is familiar to a relevant person skilled in the art, for the adjustment along the lifting direction H. With regard to said lifting direction H, an outlet opening 12 can be provided laterally on the housing 2, through which outlet opening the high-viscosity material introduced into the fluid duct 3 can escape again from the housing 2. Inlet opening 4 and outlet opening 12 can each be designed, for example, in the form of a connecting branch (not shown) which permits the inlet—or outlet-side connection of the valve mechanism 1 to further functional components, for example to a respective fluid line, a high-pressure pump, or the like.

A sealing element 13 which is designed in the manner of a diaphragm and has spring-elastic material properties is arranged in the fluid duct 3. The conceivable choice of material for the sealing element 13 is a suitable elastomer on the basis of rubber, for example ethylene-propylene-diene rubber (EPDM) or fluor caoutchouc (FKM) which provides both the desired elasticity and the material-separation properties required within the context of a diaphragm. However, the use of other suitable elastomers is also conceivable. As shown in FIG. 1*a*, the sealing element 13 is fastened by means of a first end portion 14 to the housing 2 and by means of a second end portion 15 to an outer circumferential surface 18 of the lifting piston 6. In the region between the two end portions 14, 15, the sealing element 13 is supported by a side 16 facing away from the fluid duct 3 in sections against a wall portion 17, which is an integral part of the housing 2 in the example of FIGS. 1*a* and 1*b*, in the region between the two end portions 14, 15.

In the closed state of the valve mechanism 1 that is shown in FIG. 1*a*, the fluid duct 3 is substantially unpressurized downstream of the valve opening 7. If the valve opening 7, as described above, is now opened by a movement of the lifting piston in the lifting direction H, high-viscosity material can also penetrate the region of the fluid duct 3 downstream of the valve opening 7, and therefore the diaphragm-like sealing element 13 is exposed to the fluid pressure of the high-viscosity material—which can typically assume values of 400 bar or more. In said open state of the valve mechanism 1 that is shown in FIG. 1*b*, the sealing element 13 is pressed in the region between its two end portions 14, 15 against the wall portion 17.

Looking at the illustration of the wall portion 17 in FIG. 1, it is seen that said wall portion has a concave surface contour in a profile defined with respect to the lifting direction H. Since the sealing element 13 is supported in the region between its two end portions 14, 15 against said wall portion 17, it consequently has a curved surface contour which is complementary with respect to the concave surface contour of the wall portion 17. Since the sealing element 13 is capable of being supported against the wall portion 17 as part of the housing 2, a fluid-pressure-induced cracking in the diaphragm-like sealing element 13—going as far as complete destruction thereof—is avoided. According to function, the sealing element here ensures effective protection of the components of the valve mechanism 1 that are arranged on that side of the sealing element 13 which faces away from the fluid duct 3—these include in particular the lifting piston 6 which as a component mounted movably on the housing 2, is exposed to a particular extent to a risk of damage due to the abrasive action of the high-viscosity material—against damage or even destruction.

During the movement of the lifting piston 6 in the lifting direction H, the sealing element 13 is elastically expanded in the lifting direction H in the region of a supporting portion 19 designed in the manner of a sleeve.

In the example scenario of FIGS. 1*a* and 1*b*, the sealing element 13 is spring-elastic, for which purpose the sealing element 13 can be formed from a sealing material made from an elastomer. The closed state of the valve mechanism 1 that is shown in FIG. 1*a* can now be assigned an initial state of the sealing element, and the open state of the valve mechanism that is shown in FIG. 2 can be correspondingly assigned a state which is expanded in relation to the initial state of the sealing element 13. In other words, the spring-elastic sealing element 13 expands during the movement of the lifting piston 6 from its closed position into the open position along the lifting direction H in the region of the supporting portion 19. During a movement of the lifting piston 6 in the reverse direction, i.e. counter to the lifting direction H, the sealing element 13 correspondingly undergoes a contraction because of its spring-elastic properties.

Figure 2B:
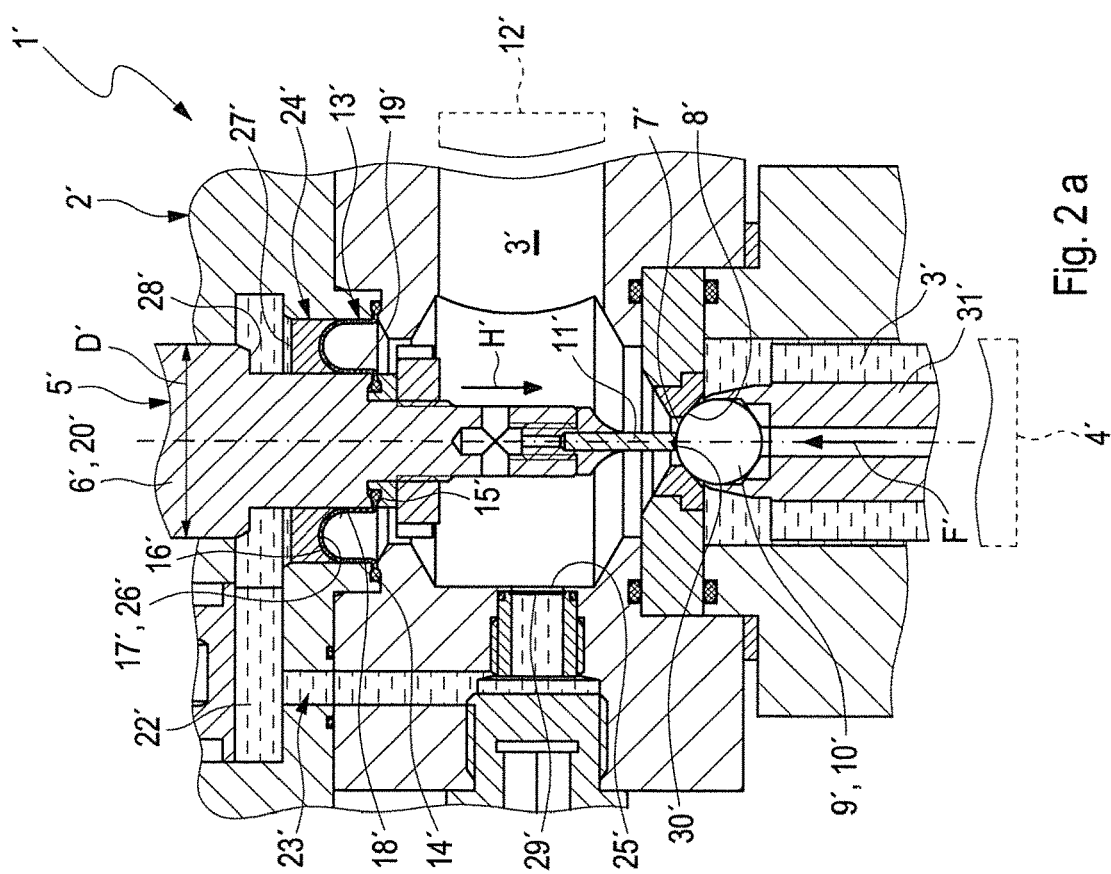
FIG. 2b shows the valve mechanism of FIG. 3 in an open position.
Figure 3:
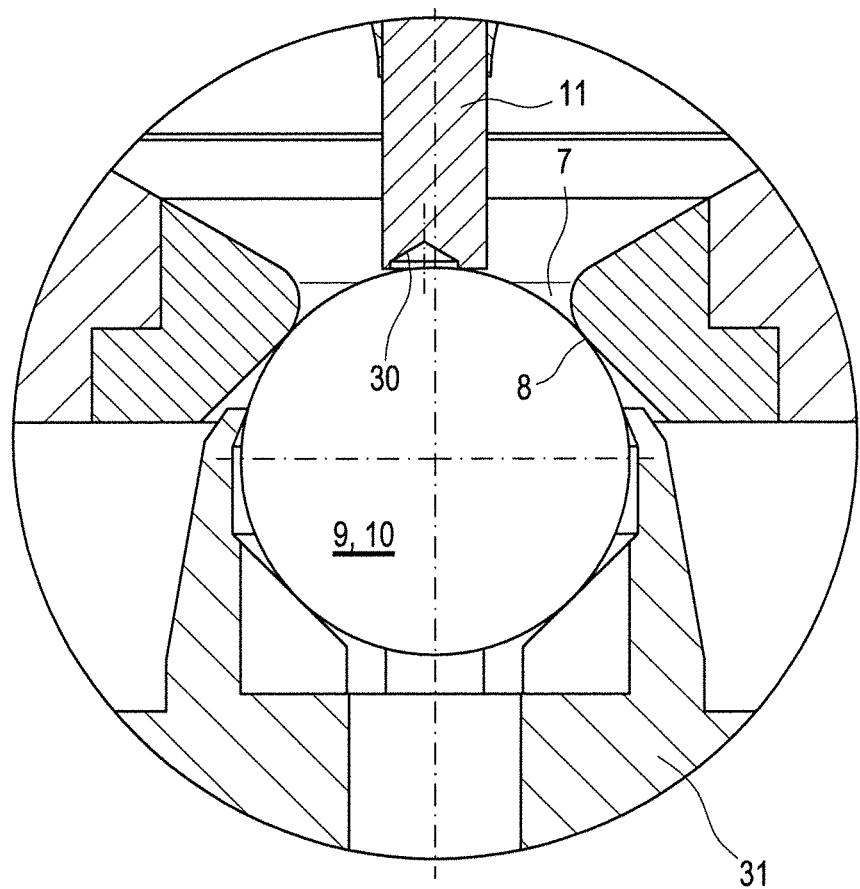
FIG. 3 shows a detailed illustration of actuating pin and closure ball.

FIG. 2 now shows a second example of a valve mechanism 1' according to the invention which differs from the valve mechanism 1 shown in FIG. 1 in that the supporting of the sealing element 13' does not take place against the housing 2', but rather against an annular piston 24' which is formed on the lifting piston 6' and the operative principle of which is explained below. Looking, for this purpose, at the illustration of FIGS. 2*a* and 2*b*—FIG. 2*a* shows the valve mechanism analogously to FIG. 1 in the closed state, and FIG. 2*b* shows same in the open state, it becomes clear that the fluid duct 3' merges along the lifting direction H' into a fluid chamber 23' which is fluidically separated from the fluid duct 3' by means of the sealing element 13'. In addition, the fluidic separation of fluid duct 3' and fluid chamber 23' takes place by means of an annular piston 24' which is formed on the lifting piston 6', protrudes outward radially therefrom and extends along the circumferential direction thereof. Said annular piston can be formed as a component separate from the lifting piston 6' or—alternatively thereto—can be formed integrally on the lifting piston 6'. The annular piston 24' is arranged along the lifting direction H' between the incompressible liquid 22' provided in the fluid chamber 23' and the sealing element 13'.

Since the annular piston 24' is movable together with the lifting piston 6' along the lifting direction H', said annular piston is pressed toward the fluid chamber 23' counter to the lifting direction H' together with the lifting piston 6' by the fluid flowing through the fluid duct 3' during the build up of pressure in the fluid duct 3'. Since the sealing element 13' can follow such a movement of the annular piston 24' only to a limited extent because of its respective end-side fastening to the housing 2', said sealing element would inevitably become detached from the annular piston 24' in the region between the end portions 14', 15', and therefore an undesirable intermediate space could form between sealing element 13' and annular piston 24'.

In order to prevent this, a coupling of the fluid chamber 23' to the fluid duct 3' in terms of pressure is realized in the example of FIG. 2 in such a manner that the fluid pressure acting on a first end side 26' of the annular piston 24'—which faces the fluid duct 3'—is compensated for at all times by a diametrically opposed counter pressure acting on a second end side 27' of the annular piston 24'—which end side faces the fluid chamber 23'. For this purpose, the fluid chamber is filled with an incompressible liquid 22'. The annular piston 24' is arranged along the lifting direction H' between fluid chamber 23' and sealing element 13' such that the second end side 27' of said annular piston is pressurized by the incompressible liquid 22', whereas the first end side 26' is pressurized by the fluid flowing through the fluid duct 3'. The two pressures are of the same magnitude in an opposed manner, i.e. cancel each other out, and therefore the lifting piston 6' can move virtually "freely" along the lifting direction H' in the fluid duct 3'. In the scenario of FIG. 2, the lifting piston 6' therefore moves in an analogous manner to the scenario of FIG. 1.

The lifting piston 6' is arranged along the lifting direction H' partially in the fluid duct 3' and partially in the fluid chamber 23'. In the example scenario of FIGS. 2a and 2b, the wall portion 17', against which the sealing element 13' is supported according to the invention, is therefore formed by the first end side 26' of the annular piston 24'. Since, in the example of FIG. 2, the wall portion 17', as part of the annular piston 24', is moved together with the lifting piston 6', during the adjustment thereof, between the open and the closed position, the movement of the sealing element 13' takes place without the latter having to be elastically expanded to a noticeable extent. In the example scenario of FIG. 2, the sealing element 13' does not necessarily have to be of spring-elastic design; on the contrary, an embodiment simply as a rolling diaphragm is entirely sufficient.

Furthermore, a passage opening 25' is provided between fluid chamber 23' and fluid duct 3'. A separating diaphragm 29', for example made from a metal, is arranged in said passage opening, the separating diaphragm separating the fluid chamber 23' from the fluid duct 3', but at the same time ensuring, via the liquid 22' arranged incompressibly in the fluid chamber 23', a coupling of the fluid F' in the fluid duct 3' in terms of pressure with the annular piston 24'.

Since the annular piston 24' brings about a spatial separation of fluid chamber 23' and fluid duct 3', the space volumes of fluid chamber 23' and fluid duct 3' are variable within a predetermined volumetric range because of the movability of the annular piston 24' in the lifting direction H'. A movement of the annular piston 24' in the lifting direction H' consequently leads to an enlargement in the space volume of the fluid chamber 23'. Since the incompressible liquid 22' provided in the fluid chamber 23' can consequently be distributed over an enlarged space volume, an optimum coupling of the fluid duct 3' to the annular piston 24' in terms of pressure via the fluid 22' is not ensured because of the associated drop in pressure. In order to avoid this, a radial step 28' is now provided along the lifting direction H' on the outer circumferential surface 18' of the lifting piston in the region of the fluid chamber 3', and therefore the diameter D' of the lifting piston 6' increases counter to the lifting direction H', i.e. away from the fluid duct 3'. The arrangement and dimensioning of said radial step 28' on the lifting piston 6' take place in such a manner that the volumetric increase in the fluid chamber 23', brought about during the movement of the lifting piston 6' and therefore of the annular piston 24', is compensated for again by the lifting piston 6' because of its enlarged piston diameter D'. This means that, to the same extent as the space volume of the fluid chamber 23' is enlarged by the movement of the annular piston 24' toward the fluid duct 3', the space volume of the fluid chamber 23' is reduced by the same volume, by displacement of the volume by the lifting piston 6' in the fluid chamber, and therefore the effective overall space volume of the fluid chamber 23' remains the same.

In the example scenario, the closure element 9, 9' is—as already explained—designed in the manner of a closure ball 10, 10' which can be mounted rotatably in the ball holder 31, 31'. The actuating element 20, 20' here comprises an actuating pin 11, 11' which interacts with the closure ball and is pressed by an axial end portion against the closure ball in order to move the closure ball away from the closed position.

In order as far as possible to avoid wear effects occurring in the closure ball 10, 10', the actuating pin 11, 11' can be designed in such a manner that, upon contact with the closure ball, 10, 10', said actuating pin rotates the latter, with a torque being exerted, by a predetermined amount, and therefore the contact surfaces of actuating element 11, 11' and closure ball 10, 10' are changed during each renewed contact of the actuating pin, 11, 11' with the closure ball 10, 10'.

In an embodiment to be realized technically, said torque can be produced by, on an end side of the actuating pin 11, 11' that faces the closure ball 10, 10', a recess 30, 30' being provided which is arranged eccentrically with respect to the longitudinal central axis of said actuating pin and by means of which a torque acting on the closure ball 10, 10' is produced by the actuating pin 11, 11' upon contact therewith. In a variant, it may also be conceived to provide the actuating pin 11, 11' with a concentric recess and to arrange the entire actuating pin 11, 11' eccentrically with respect to the closure ball 10, 10'.

The invention claimed is:

1. A valve mechanism (1; 1') for controlling a fluid in the form of an abrasive high-viscosity material, comprising:
   a housing (2; 2') having a fluid duct (3; 3') extending therethrough, the fluid duct having an inner surface and a tubular wall extending from the inner surface in a first direction normal to the inner surface, and a valve opening (7; 7') formed in the fluid duct (3; 3') and bordered by a valve seat (8; 8'),
   a valve body (5; 5') mounted in the housing (2; 2') and extending into the fluid duct (3; 3') and having an outer surface, the valve body (5; 5') having a closure element (9; 9') actuated by a lifting piston (6; 6') that is movable along a lifting direction (H; H') in the fluid duct (3; 3'), the valve body (5; 5') being adjustable between an open state, in which said valve body opens up the fluid duct (3; 3') for fluid flow with a fluid (F; F'), and a closed state, in which the closure element (9; 9') bears against the valve seat and said valve body closes the fluid duct (3; 3') in a fluid-tight manner,
   a sealing element mounting portion formed by a tubular surface of the housing (2; 2') facing toward and spaced from the valve body (5; 5'), a surface of the valve body (5; 5') facing toward the tubular surface and a concave surface of the housing extending between the tubular surface and the valve body at a position spaced from the fluid duct, the sealing element mounting portion defining a tubular concavity open towards the fluid duct, and
   a sealing element (13; 13') defining a diaphragm having spaced-apart first and second end portions (14; 14'; 15; 15'), the first end portion (14; 14') fastened to the inner surface of the fluid duct and the second end portion (15, 15') fastened to an outer circumferential surface of the lifting piston (6; 6'), the sealing element (13; 13') between the first and second end portions including a supporting portion (19; 19') defining a sleeve supported against the outer circumferential surface of the lifting piston (6; 6') and another portion (16) bearing against the sealing member mounting portion at least when the valve body is in an open state, wherein the fluid duct (3') is separated fluidically from a fluid chamber (23') by the sealing element (13') and, the fluid chamber (23') is filled with an incompressible liquid (22'), and therefore the lifting piston (6') is arranged along the lifting direction (H') partially in the fluid duct (3') and partially in the fluid chamber (23'), an annular piston (24') is formed on the lifting piston (6'), the annular piston (24') protrudes radially outward and extends along a circumferential direction of the lifting piston (6'), a wall portion (17') is formed by a first end side (26') of the annular piston (24'), a passage opening (25') is provided between the fluid chamber (23') and fluid duct (3') and in which a separating diaphragm (29') is arranged, by means of which the fluid duct (3') is coupled in terms of pressure or couplable in terms of pressure to the annular piston (24').

2. The valve mechanism (1) of claim 1, wherein:
the sealing element (13) is of spring-elastic design,
the sealing element (13) is in a starting state in the closed state of the valve body (5) and is in a state extended in relation to the starting state in the open state of the valve body (5),
the elastic expansion of the sealing element (13) substantially takes place in a region of the supporting portion (19).

3. The valve mechanism (1') of claim 1, wherein
the annular piston (24') is arranged along the lifting direction (H') between the incompressible liquid (22') and the sealing element (13') such that a second end side (27') of the annular piston (24') lying opposite the first end side (26') is exposed to the incompressible liquid (22').

4. The valve mechanism (1') of claim 1, wherein:
a radial step (28') is provided along the lifting direction (H') on the outer circumferential surface (18') of the lifting piston (6') in the region of the fluid chamber (23').

5. The valve mechanism of claim 1, wherein:
the sealing element (13') is a rolling diaphragm.

6. The valve mechanism (1; 1') of claim 1, wherein:
the sealing element (13; 13') comprises a sealing material made from an elastomer.

7. The valve mechanism (1; 1') of claim 1, wherein:
the closure element (9; 9') is a closure ball (10; 10') that is accommodated rotatably in a ball holder (31; 31').

8. The valve mechanism (1; 1') of claim 1, wherein:
the sealing element (13; 13') comprises a sealing material made from an elastomer.

9. A valve mechanism (1; 1') for controlling a fluid in the form of an abrasive high-viscosity material, comprising:
a housing (2; 2') having a fluid duct (3; 3') extending therethrough,
a valve body (5; 5') mounted in the housing (2; 2') and having an actuating element (20; 20') for adjusting the valve body in a lifting direction (H') between an open state, in which said valve body opens up the fluid duct (3; 3') for fluid flow with a fluid (F; F'), and a closed state, in which said valve body closes the fluid duct (3; 3') in a fluid-tight manner, and an annular piston (24') formed on the actuating element (20; 20') and projecting radially therefrom,
a sealing element (13; 13') defining a diaphragm having spaced-apart first and second end portions (14; 14'; 15; 15'), the first end portion (14; 14') fastened to the housing (2; 2') and the second end portion (15, 15') fastened to the valve body (5; 5'), and a portion (16) of the sealing element between the first and second end portions (14; 14'; 15; 15') bears against a wall portion formed by a first end side (26') of the annular piston (24') at least when the valve body is in an open state,
a fluid chamber (23') fluidically separated from the fluid duct by the sealing element (13; 13'), the fluid chamber (23') filled with an incompressible liquid (22'), and
a passage opening (25') between the fluid chamber (23') and the fluid duct (3') with a separating diaphragm (29') arranged therein, the passage opening (25') and the separating diaphragm (29') coupling the fluid duct (3') to the annular piston (24') in terms of pressure, wherein
the fluid duct (3') merges along the lifting direction (H') into the fluid chamber (23') while remaining fluidically separated therefrom by the sealing element (13, 13'), and
the actuating element (20; 20') is arranged along the lifting direction (H') partially in the fluid duct (3') and partially in the fluid chamber (23').

* * * * *